(12) United States Patent
Annan

(10) Patent No.: US 12,330,561 B2
(45) Date of Patent: Jun. 17, 2025

(54) VEHICLE SIDE MIRROR WITH HIDDEN BLIND SPOT MIRROR DEVICE

(71) Applicant: Daniel Annan, Ladera Ranch, CA (US)

(72) Inventor: Daniel Annan, Ladera Ranch, CA (US)

( * ) Notice: Subject to any disclaimer, the term of this patent is extended or adjusted under 35 U.S.C. 154(b) by 6 days.

(21) Appl. No.: 18/338,387

(22) Filed: Jun. 21, 2023

(65) Prior Publication Data
US 2023/0406210 A1    Dec. 21, 2023

Related U.S. Application Data

(60) Provisional application No. 63/353,994, filed on Jun. 21, 2022.

(51) Int. Cl.
*B60R 1/25* (2022.01)
*B60R 1/00* (2022.01)
*B60R 1/12* (2006.01)
*B60R 1/30* (2022.01)

(52) U.S. Cl.
CPC ............ *B60R 1/25* (2022.01); *B60R 1/006* (2013.01); *B60R 1/1207* (2013.01); *B60R 1/30* (2022.01)

(58) Field of Classification Search
CPC .. B60R 1/25; B60R 1/30; B60R 1/006; B60R 1/1207
See application file for complete search history.

(56) References Cited

U.S. PATENT DOCUMENTS

| | | | |
|---|---|---|---|
| 11,407,360 B1* | 8/2022 | Huang | F21S 43/245 |
| 2005/0265037 A1* | 12/2005 | Newton | B60R 1/1207 |
| | | | 362/494 |
| 2007/0058257 A1* | 3/2007 | Lynam | B60Q 1/0023 |
| | | | 359/604 |
| 2011/0168687 A1* | 7/2011 | Door | B60R 1/0602 |
| | | | 219/202 |
| 2016/0137126 A1* | 5/2016 | Fürsich et al. | B60R 1/26 |
| | | | 348/148 |
| 2017/0313250 A1* | 11/2017 | Fischer | B60R 1/083 |
| 2018/0251068 A1* | 9/2018 | Felix | A01M 29/26 |
| 2020/0238914 A1* | 7/2020 | Almahmoud | B60R 1/06 |
| 2022/0203898 A1* | 6/2022 | Warren | B60R 1/12 |

\* cited by examiner

*Primary Examiner* — Thai Q Tran
*Assistant Examiner* — Jose M Mesa
(74) *Attorney, Agent, or Firm* — Brennan, Manna & Diamond, LLC

(57) ABSTRACT

A vehicle side mirror with hidden blind spot mirror device is provided. The device is comprised of a main mirror with at least one display screen positioned under the top surface of the main mirror. The device provides an improved vehicle side mirror with a blind spot mirror display that is only visible (i.e., illuminated) when a secondary vehicle is detected in the blind spot of the vehicle the device is attached to.

19 Claims, 4 Drawing Sheets

VEHICLE SIDE MIRROR WITH HIDDEN BLIND SPOT MIRROR DEVICE

CROSS-REFERENCE TO RELATED APPLICATION

The present application claims priority to, and the benefit of, U.S. Provisional Application No. 63/353,994, which was filed on Jun. 21, 2022, and is incorporated herein by reference in its entirety.

FIELD OF THE INVENTION

The present invention relates generally to the field of vehicle side mirrors. More specifically, the present invention relates to a vehicle side mirror with a hidden blind spot mirror device. The device provides a vehicle side mirror made of a two-way mirror wherein a display positioned behind the mirror is illuminated when a vehicle is detected in the blind spot of the user. Accordingly, the present disclosure makes specific reference thereto. Nonetheless, it is to be appreciated that aspects of the present invention are also equally applicable to other like applications, devices, and methods of manufacture.

BACKGROUND

Many vehicles have blind spot mirrors located on the driver and passenger side mirrors. However, existing blind spot mirrors are always present on the main side mirror. As a result, a blind spot mirror constantly obstructs a portion of the side mirror. This is undesirable, as all mirror space of the side mirror is not being used and therefore a smaller mirrored image is displayed.

Therefore, there exists a long-felt need in the art for an improved vehicle side mirror. Further, there exists a long-felt need in the art for a vehicle side mirror with a hidden blind spot mirror that provides a blind spot mirror that does not obstruct the functionality of the main side mirror when in use. In addition, there exists a long-felt need in the art for a vehicle side mirror with a hidden blind spot mirror that is only visible when needed and when in use.

The subject matter disclosed and claimed herein, in one embodiment thereof, comprises a vehicle side mirror with hidden blind spot mirror device. The device is comprised of a main mirror with at least one display screen positioned under the top surface of the main mirror. The device provides an improved vehicle side mirror with a blind spot mirror display that is only visible (i.e., illuminated) when a second vehicle is detected in the blind spot of the vehicle the device is attached to. More specifically, the secondary vehicle is detected by a sensor and is recorded in real-time via a camera, wherein the camera feed is displayed on the display screen.

In this manner, the vehicle side mirror with hidden blind spot mirror device of the present invention accomplishes all the forgoing objectives and provides an improved vehicle side mirror. More specifically, the device provides a blind spot mirror that does not obstruct the functionality of the main side mirror when in use. In addition, the device is only visible when needed and when in use.

SUMMARY

The following presents a simplified summary to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a vehicle side mirror with hidden blind spot mirror device. The device is comprised of a main mirror with at least one display screen positioned on/under the top surface of the main mirror. The device provides an improved vehicle side mirror with a blind spot mirror that is only visible when a second vehicle is detected in the blind spot of the vehicle the device is attached to.

The device is comprised of a body with at least one main mirror. The mirror may have any shape of any existing vehicle side mirror known in the art to fit any model of vehicle. However, the mirror is preferably a two-way mirror that allows the display screen to be visible through the top surface of the main mirror.

The display screen may be comprised of any electronic display screen known in the art. The display screen is preferably positioned underneath the top surface of the main mirror. The display screen is comprised of at least one camera. The camera is also preferably a fish-eye or a wide FOV camera to capture as much of the blind spot of the vehicle the device is attached to as possible.

The camera is in electrical communication with at least one sensor of the display. The sensor is preferably but not limited to a radar sensor that can detect the presence of another vehicle in the blind spot of the main mirror. Once another vehicle has been detected, the sensor activates the camera which begins displaying a real-time video feed of the blind spot via the display. When the sensor does not detect another vehicle in the blind spot, the display remains off. During this time, the main mirror resembles a traditional vehicle side mirror. The display screen is also comprised of at least one light sensor that detects the amount of ambient light and automatically adjusts the brightness of the display screen accordingly for optimal viewing. In addition, the display is comprised of at least one indicator light. When a secondary vehicle is detected in the blind spot via the first sensor, the indicator illuminates until the secondary vehicle is no longer in the blind spot.

In one embodiment, the camera is in wired electrical communication with the electronic systems of the vehicle the device is attached to. In this embodiment, the camera may alternatively/also be activated when a user engages their right or left turn signal. This allows the camera and screen to remain off until necessary when a user is changing lanes.

The present invention is also comprised of a method of using the device. First, a device is provided comprised of a main mirror comprised of a display screen comprised of at least one first sensor, at least one camera, and at least one indicator light. Then, a user views the display screen when illuminated to view the blind spot of the main mirror while driving.

The present invention is also comprised of a second method of using the device. First, a device is provided comprised of a main mirror comprised of a display screen comprised of at least one first sensor, at least one camera, and at least one indicator light. Then, a user activates a turn signal of the vehicle the device is attached to/a part of. Next, a user views the display screen when illuminated to view the blind spot of the main mirror while driving to determine if it is safe to turn/change lanes.

Accordingly, the vehicle side mirror with hidden blind spot mirror device of the present invention is particularly advantageous as it provides an improved vehicle side mirror. More specifically, the device provides a blind spot mirror that does not obstruct the functionality of the main side mirror when in use. In addition, the device is only visible when needed and when in use. In this manner, the vehicle side mirror with hidden blind spot mirror device overcomes the limitations of existing vehicle side mirrors known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
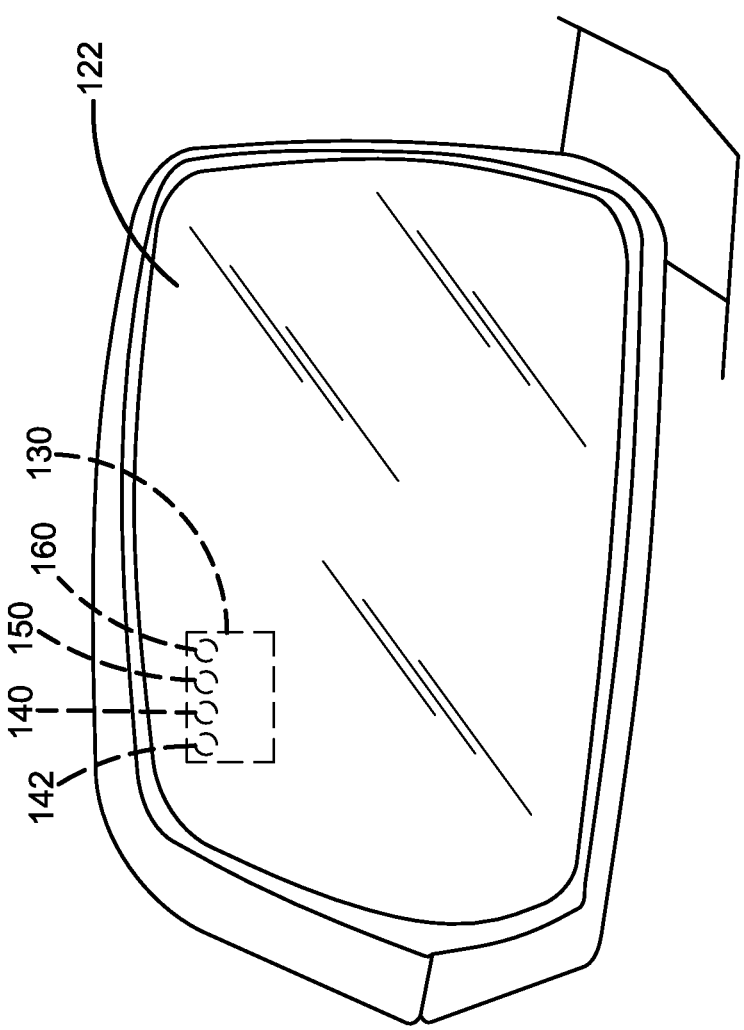
FIG. 1 illustrates a front-on view of one potential embodiment of a vehicle side mirror with hidden blind spot mirror device of the present invention when the display is not illuminated in accordance with the disclosed architecture.

The innovation is now described with reference to the drawings, wherein like reference numerals are used to refer to like elements throughout. In the following description, for purposes of explanation, numerous specific details are set forth to provide a thorough understanding thereof. It may be evident, however, that the innovation can be practiced without these specific details. In other instances, well-known structures and devices are shown in block diagram form to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for an improved vehicle side mirror. Further, there exists a long-felt need in the art for a vehicle side mirror with a hidden blind spot mirror that provides a blind spot mirror that does not obstruct the functionality of the main side mirror when in use. In addition, there exists a long-felt need in the art for a vehicle side mirror with a hidden blind spot mirror that is only visible when needed and when in use.

The present invention, in one exemplary embodiment, is comprised of a vehicle side mirror with hidden blind spot mirror device comprised of a main mirror with at least one display screen positioned on/under the top surface of the main mirror. The device provides an improved vehicle side mirror with a blind spot mirror that is only visible when a second vehicle is detected in the blind spot of the vehicle the device is attached to.

The device is comprised of a body with at least one main mirror of any shape of any existing vehicle side mirror known in the art to fit any model of vehicle. However, the mirror is preferably a two-way mirror that allows the display screen to be visible through the top surface of the main mirror. The display screen may be comprised of any electronic display screen known in the art. The display screen is preferably positioned underneath the top surface of the main mirror. The display screen is comprised of at least one camera. The camera is also preferably a fish-eye or a wide FOV camera to capture as much of the blind spot of the vehicle the device is attached to as possible.

The camera is in electrical communication with at least one sensor of the display. The sensor is preferably but not limited to a radar sensor that can detect the presence of another vehicle in the blind spot of the main mirror. Once another vehicle has been detected, the sensor activates the camera which begins displaying a real-time video feed of the blind spot via the display. When the sensor does not detect another vehicle in the blind spot, the display remains off. During this time, the main mirror resembles a traditional vehicle side mirror.

The display screen is also comprised of at least one light sensor that detects the amount of ambient light and automatically adjusts the brightness of the display screen accordingly for optimal viewing. In addition, the display is comprised of at least one indicator light. When a secondary vehicle is detected in the blind spot via the first sensor, the indicator illuminates until the secondary vehicle is no longer in the blind spot.

In one embodiment, the camera is in wired electrical communication with the electronic systems of the vehicle the device is attached to. In this embodiment, the camera may alternatively/also be activated when a user engages their right or left turn signal. This allows the camera and screen to remain off until necessary when a user is changing lanes.

The present invention is also comprised of a method of using the device. First, a device is provided comprised of a main mirror comprised of a display screen comprised of at least one first sensor, at least one camera, and at least one indicator light. Then, a user views the display screen when illuminated to view the blind spot of the main mirror while driving.

The present invention is also comprised of a second method of using the device. First, a device is provided comprised of a main mirror comprised of a display screen comprised of at least one first sensor, at least one camera, and at least one indicator light. Then, a user activates a turn signal of the vehicle the device is attached to/a part of. Next, a user views the display screen when illuminated to view the blind spot of the main mirror while driving to determine if it is safe to turn/change lanes.

Accordingly, the vehicle side mirror with hidden blind spot mirror device of the present invention is particularly advantageous as it provides an improved vehicle side mirror. More specifically, the device provides a blind spot mirror that does not obstruct the functionality of the main side mirror when in use. In addition, the device is only visible when needed and when in use. In this manner, the vehicle side mirror with hidden blind spot mirror device overcomes the limitations of existing vehicle side mirrors known in the art.

Referring initially to the drawings, FIG. 1 illustrates a front-on view of one potential embodiment of a vehicle side mirror with hidden blind spot mirror device 100 of the present invention when the display 120 is not illuminated in accordance with the disclosed architecture. The device 100 is comprised of a main mirror 120 with at least one display screen 130 positioned on/under the top surface 122 of the main mirror 120. The device 100 provides an improved vehicle side mirror, wherein at least one display screen 130 functions as a blind spot mirror but is only visible when a secondary vehicle 10 is detected in the blind spot of the vehicle the device 100 is attached to.

The device 100 is comprised of a body 110 with at least one main mirror 120. The mirror 120 may have any shape of any existing vehicle side mirror known in the art to fit any model of vehicle. However, the mirror 120 is preferably a two-way mirror that allows the display screen 130 to be visible through the top surface 122 of the main mirror 120. Said two-way mirror 120 is preferably made from a combination of semi-transparent aluminum, glass, and/or acrylic.

The display screen 130 may be comprised of any electronic display screen known in the art. The display screen 130 is preferably positioned underneath the top surface 122 of the main mirror 120 for protection of the screen 130. However, in one embodiment the display screen 130 is positioned on the top surface 122. In this embodiment, the screen 130 is comprised of an impact-resistant screen for protection of the screen 130.

The display screen 130 is comprised of at least one camera 150. The camera 150 may be any type known in the art. Said types include a thermal camera, a night vision camera, a daylight camera, etc. or some combination. The camera 150 is also preferably a fish-eye or a wide FOV camera to capture as much of the blind spot of the vehicle the device 100 is attached to as possible.

Figure 2:
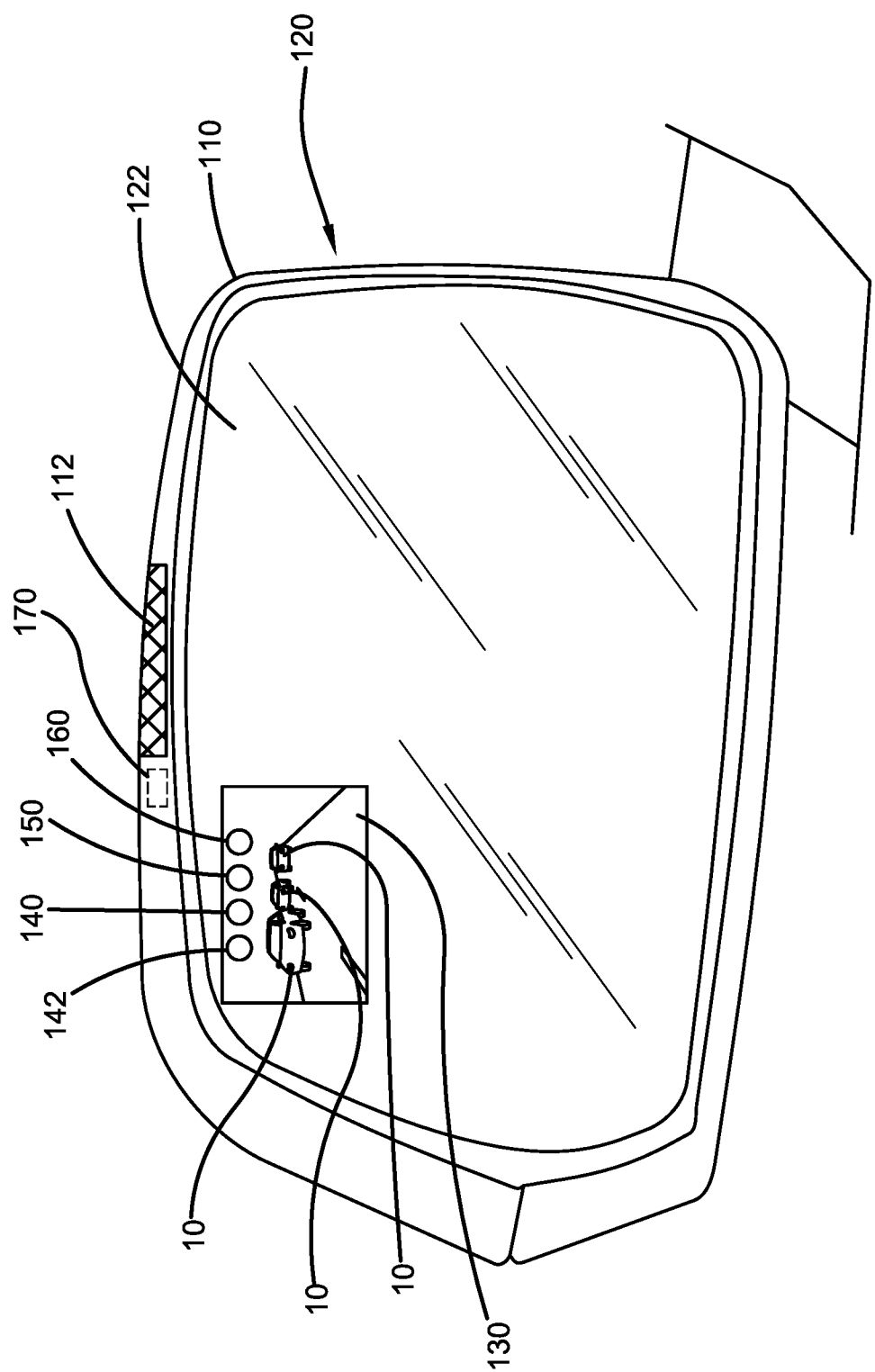
FIG. 2 illustrates a front-on view of one potential embodiment of a vehicle side mirror with hidden blind spot mirror device of the present invention when the display is illuminated in accordance with the disclosed architecture.

The camera 150 is in electrical communication with at least one sensor 140 of the display 130. The sensor 140 is preferably but not limited to a radar sensor that can detect the presence of another vehicle 10 in the blind spot of the main mirror 120. Once another vehicle 10 has been detected, the sensor 140 activates the camera 150 which begins displaying a real-time video feed of the blind spot via the display 130, as seen in FIG. 2.

When the sensor 140 does not detect another vehicle in the blind spot, the display 130 remains off. During this time, the main mirror 120 resembles a traditional vehicle side mirror. The display screen 130 may be positioned at any location on the main mirror 120. The screen 130 may also be any shape and take up any portion of the main mirror 120.

The display screen 130 is also comprised of at least one light sensor 142. The sensor 142 detects the amount of ambient light and automatically adjusts the brightness of the display screen 130 accordingly for optimal viewing. In addition, the display 130 is comprised of at least one indicator light 160. When a secondary vehicle 10 is detected in the blind spot via the first sensor 140, the indicator 160 illuminates until the secondary vehicle 10 is no longer in the blind spot. The light 160 may blink, flash, constantly illuminate, etc. any color in the art, at any brightness level.

The device 100 is powered by at least one battery 170. The battery 170 is preferably in wired electrical communication with the electrical system of the vehicle to draw constant power. In another embodiment, the body 110 of the main mirror 120 is comprised of at least one solar panel 112 which charges the battery 170.

In one embodiment, the camera 150 is in wired electrical communication with the electronic systems of the vehicle the device 100 is attached to. In this embodiment, the camera 150 may alternatively/also be activated when a user engages their right or left turn signal. This allows the camera 150 and screen 130 to remain off until necessary when a user is changing lanes.

Figure 3:
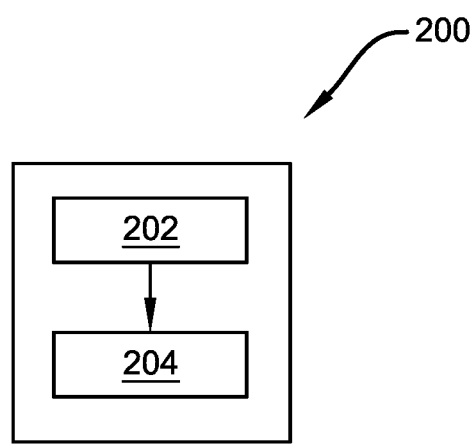
FIG. 3 illustrates a flowchart of a method of using one potential embodiment of a vehicle side mirror with hidden blind spot mirror device of the present invention in accordance with the disclosed architecture.

The present invention is also comprised of a method of using 200 the device 100, as seen in FIG. 3. First, a device 100 is provided comprised of a main mirror 120 comprised of a display screen 130 comprised of at least one first sensor 140, at least one camera 150, and at least one indicator light 160 [Step 202]. Then, a user views the display screen 130 when illuminated to view the blind spot of the main mirror 120 while driving [Step 204]. It is worth nothing that the indicator light 160, camera 150 and display screen 130 can each be independently turned on and off depending on user preference.

Figure 4:
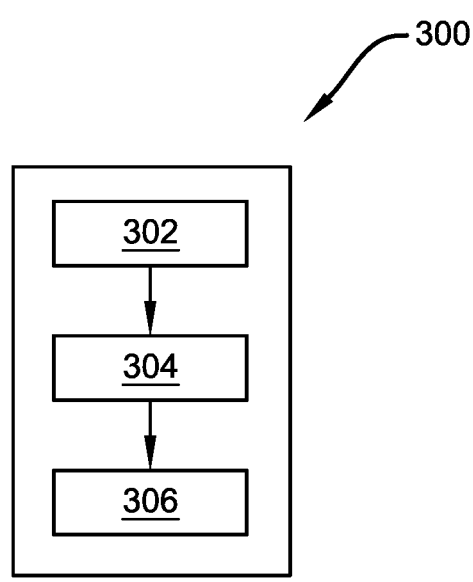
FIG. 4 illustrates a flowchart of a method of using one potential embodiment of a vehicle side mirror with hidden blind spot mirror device of the present invention in accordance with the disclosed architecture.

The present invention is also comprised of a second method of using 300 the device 100, as seen in FIG. 4. First, a device 100 is provided comprised of a main mirror 120 comprised of a display screen 130 comprised of at least one first sensor 140, at least one camera 150, and at least one indicator light 160 [Step 302]. Then, a user activates a turn signal of the vehicle the device 100 is attached to/a part of [Step 304]. Next, a user views the display screen 130 when illuminated to view the blind spot of the main mirror 120 while driving to determine if it is safe to turn/change lanes [Step 306].

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "vehicle side mirror with hidden blind spot mirror device" and "device" are interchangeable and refer to the vehicle side mirror with hidden blind spot mirror device 100 of the present invention.

Notwithstanding the forgoing, the vehicle side mirror with hidden blind spot mirror device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the vehicle side mirror with hidden blind spot mirror device 100 as shown in the FIGS. are for illustrative purposes only, and that many other sizes and shapes of the vehicle side mirror with hidden blind spot mirror device 100 are well within the scope of the present disclosure. Although the dimensions of the vehicle side mirror with hidden blind spot mirror device 100 are important design parameters for user convenience, the vehicle side mirror with hidden blind spot mirror device 100 may be of any size, shape, and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A vehicle side mirror with hidden blind spot mirror device comprising:
   a mirror; and
   a display screen positioned under a top surface of the mirror, the display screen comprised of a camera, a light sensor, a radar sensor, and an indicator light; and
   wherein the mirror is a semi-transparent aluminum mirror; and
   wherein the display screen is only visible through the mirror when a secondary vehicle is detect in a blind spot by the radar sensor.

2. The vehicle side mirror with hidden blind spot mirror device of claim 1 further comprised of a battery.

3. The vehicle side mirror with hidden blind spot mirror device of claim 1, wherein the battery powers the camera, the sensor, and the indicator light.

4. The vehicle side mirror with hidden blind spot mirror device of claim 1, wherein the battery is powered by a solar panel.

5. The vehicle side mirror with hidden blind spot mirror device of claim 1, wherein the mirror is further comprised of a two-way mirror.

6. A vehicle side mirror with hidden blind spot mirror device comprising:
   a two-way semi-transparent aluminum mirror; and
   a display screen positioned under a top surface of the two-way semi-transparent aluminum mirror, the display screen comprised of an impact resistant screen, a camera, a first sensor, a second sensor, and an indicator light; and
   wherein the display screen is only visible through the two-way semi-transparent aluminum mirror when a secondary vehicle is detect in a blind spot by the first sensor.

7. The vehicle side mirror with hidden blind spot mirror device of claim 6, wherein the first sensor is comprised of a radar sensor.

8. The vehicle side mirror with hidden blind spot mirror device of claim 6, wherein the second sensor is comprised of a light sensor.

9. The vehicle side mirror with hidden blind spot mirror device of claim 6, wherein the second sensor automatically adjusts a brightness of the display screen.

10. The vehicle side mirror with hidden blind spot mirror device of claim 6, wherein the display screen is comprised of an electronic display screen.

11. The vehicle side mirror with hidden blind spot mirror device of claim 6, wherein the camera is comprised of a fish eye camera.

12. The vehicle side mirror with hidden blind spot mirror device of claim 6, wherein the camera is comprised of a night vision camera.

13. The vehicle side mirror with hidden blind spot mirror device of claim 6, wherein the indicator light continuously illuminates or flashes.

14. The vehicle side mirror with hidden blind spot mirror device of claim 6, wherein the indicator light is illuminated when the first sensor is activated.

15. The vehicle side mirror with hidden blind spot mirror device of claim 6, wherein the camera is activated when the first sensor is activated.

16. The vehicle side mirror with hidden blind spot mirror device of claim 6, wherein a real time video from the camera is displayed via the display screen.

17. A method of using a vehicle side mirror with hidden blind spot mirror device, the method comprising the following steps:
   providing a vehicle side mirror with hidden blind spot mirror device comprised of a main mirror comprised of a display screen, the display screen comprised of an impact resistant screen, a sensor, a camera, and an indicator light; and
   viewing the display screen when the display screen is illuminated to view the blind spot of the main mirror; and
   wherein the display screen is only illuminated and visible through the mirror when a secondary vehicle is detect in a blind spot by the sensor.

18. The method of claim 17, wherein the vehicle side mirror with hidden blind spot mirror device is attached to a vehicle.

19. The method of claim 17 further comprised of activating a turn signal of the vehicle.

* * * * *